US009416285B2

(12) United States Patent
Allen et al.

(10) Patent No.: US 9,416,285 B2
(45) Date of Patent: Aug. 16, 2016

(54) ACRYLATE INK COMPOSITIONS FOR INK-BASED DIGITAL LITHOGRAPHIC PRINTING

(71) Applicant: XEROX CORPORATION, Norwalk, CT (US)

(72) Inventors: C. Geoffrey Allen, Waterdown (CA); Carolyn Moorlag, Mississauga (CA); Guiqin Song, Milton (CA); Mihaela Maria Birau, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/573,913

(22) Filed: Dec. 17, 2014

(65) Prior Publication Data
US 2016/0177113 A1 Jun. 23, 2016

(51) Int. Cl.
*C09D 11/12* (2006.01)
*C09D 11/107* (2014.01)

(52) U.S. Cl.
CPC .............. *C09D 11/12* (2013.01); *C09D 11/107* (2013.01)

(58) Field of Classification Search
None
See application file for complete search history.

(56) References Cited

U.S. PATENT DOCUMENTS

| | | | |
|---|---|---|---|
| 3,945,957 A | 3/1976 | Noshiro et al. |
| 4,304,601 A | 12/1981 | Sharp |
| 4,403,550 A | 9/1983 | Sharp |
| 4,445,432 A | 5/1984 | Ford, Jr. et al. |
| 4,806,391 A | 2/1989 | Shorin |
| 4,911,999 A | 3/1990 | Legere |
| 4,927,180 A | 5/1990 | Trundle et al. |
| 5,085,698 A | 2/1992 | Ma et al. |
| 5,502,476 A | 3/1996 | Neal et al. |
| 5,886,067 A | 3/1999 | Li et al. |
| 6,329,446 B1 | 12/2001 | Sacripante et al. |
| 6,348,561 B1 | 2/2002 | Mychajlowskij et al. |
| 6,664,015 B1 | 12/2003 | Sacripante |
| 6,896,937 B2 | 5/2005 | Woudenberg |
| 7,022,752 B2 | 4/2006 | Hayashi et al. |
| 7,202,006 B2 | 4/2007 | Chopra et al. |
| 7,322,688 B2 | 1/2008 | Woudenberg |
| 7,538,070 B2 | 5/2009 | Iftime et al. |
| 7,556,844 B2 | 7/2009 | Iftime et al. |
| 7,674,326 B2 | 3/2010 | Iftime et al. |
| 7,708,396 B2 | 5/2010 | Iftime et al. |
| 7,718,325 B2 | 5/2010 | Norsten et al. |
| 7,909,924 B2 | 3/2011 | Krishnan et al. |
| 7,964,271 B2 | 6/2011 | Norsten et al. |
| 8,001,889 B2 | 8/2011 | Gaugenrieder et al. |
| 8,158,693 B2 | 4/2012 | Breton et al. |
| 8,222,313 B2 | 7/2012 | Iftime et al. |
| 8,771,787 B2 | 7/2014 | Breton et al. |
| 2002/0040073 A1 | 4/2002 | Stone et al. |
| 2002/0107303 A1 | 8/2002 | Miyabashi et al. |
| 2003/0003323 A1 | 1/2003 | Murakami |
| 2003/0044691 A1 | 3/2003 | Setthachayanon et al. |
| 2003/0149130 A1 | 8/2003 | Kondo |
| 2004/0063809 A1 | 4/2004 | Fu et al. |
| 2004/0132862 A1 | 7/2004 | Woudenberg |
| 2004/0233465 A1 | 11/2004 | Coyle |
| 2007/0166479 A1 | 7/2007 | Drake et al. |
| 2007/0259986 A1 | 11/2007 | Elwakil et al. |
| 2008/0139743 A1* | 6/2008 | Krishnan ............... C09D 11/03 524/612 |
| 2008/0241485 A1 | 10/2008 | Shimohara et al. |
| 2008/0258345 A1 | 10/2008 | Bens et al. |
| 2008/0317957 A1 | 12/2008 | Overbeek et al. |
| 2009/0038506 A1 | 2/2009 | Odell et al. |
| 2009/0110843 A1 | 4/2009 | Halahmi et al. |
| 2009/0135239 A1 | 5/2009 | Chretien et al. |
| 2009/0280302 A1 | 11/2009 | Fukumoto et al. |
| 2010/0020123 A1 | 1/2010 | Hirato |
| 2010/0067056 A1 | 3/2010 | Rich et al. |
| 2011/0045199 A1 | 2/2011 | Cong |
| 2011/0188023 A1 | 8/2011 | Rondon et al. |
| 2011/0262711 A1 | 10/2011 | Chopra et al. |
| 2012/0040156 A1* | 2/2012 | Ohashi ................ C09D 11/322 428/207 |
| 2012/0103212 A1 | 5/2012 | Stowe et al. |
| 2012/0103218 A1 | 5/2012 | Stowe et al. |
| 2012/0103221 A1 | 5/2012 | Stowe et al. |
| 2013/0050366 A1 | 2/2013 | Sasada et al. |
| 2013/0104756 A1 | 5/2013 | Stowe et al. |
| 2013/0305946 A1 | 11/2013 | Iftime et al. |
| 2013/0305947 A1 | 11/2013 | Iftime et al. |

(Continued)

FOREIGN PATENT DOCUMENTS

JP 03069954 A 3/1991
WO 2013119539 A1 8/2013

OTHER PUBLICATIONS

Allen, et al., "Acrylate Ink Compositions for Ink-Based Digital Lithographic Printing", US. Appl No. 14/610,437, filed Jan. 30, 2015.

(Continued)

*Primary Examiner* — Matthew G Marini
*Assistant Examiner* — Michael Robinson
(74) *Attorney, Agent, or Firm* — MH2 Technology Law Group LLP

(57) ABSTRACT

An ink composition, including an ink base and a wax emulsion. A viscosity of the ink composition is between 80 Pa·s and 400 Pa·s at 100 rad/s and 25° C., and a tack of the ink composition is between 32 g-m and 45 g-m at 60 seconds. The total wax content of the ink composition is between 1% and 5% by weight, based on a total weight of the ink composition, and the total water content of the ink composition is between 1% and 15% by weight, based on the total weight of the ink composition.

20 Claims, 1 Drawing Sheet

(56) References Cited

U.S. PATENT DOCUMENTS

2013/0310517 A1    11/2013  Lee et al.
2013/0324653 A1*   12/2013  Bollard .................. C08F 2/18
                                                          524/251
2014/0235752 A1     8/2014  Gharapetian et al.
2015/0093690 A1     4/2015  Shimura et al.

OTHER PUBLICATIONS

Birau, et al., "White Ink Composition for Ink-Based Digital Printing", U.S. Appl. No. 14/619,820, filed Feb. 11, 2015.
Moorlag, et al., "Hyperbranched Ink Compositions for Controlled Dimensional Change and Low Energy Curing", U.S. Appl. No. 14/620,945, filed Feb. 12, 2015.
Breton, et al., "Process Black Ink Compositions and Uses Thereof", U.S. Appl. No. 14/635,679, filed Mar. 2, 2015.
Leach, et al., "The Printing Ink Manual, 5th Edition", Blue Print, New York, pp. 84-86, 516, 525, 544-550, 724-726 (1993).
Henri Bouas-Laurent, et al., Organic Photochromism (IUPAC Technical Report), Pure Appl. Chem., vol. 73, No. 1, pp. 639-665, 2001.
Communication dated May 4, 2015, issued in EP Appl. No. 14196839.6, pp. 1-5.
Thesis of Enrique Michel-Sanchez, Impact of Particle Morphology on the Rheology of PCC-Based Coatings, Aug. 2005.

* cited by examiner

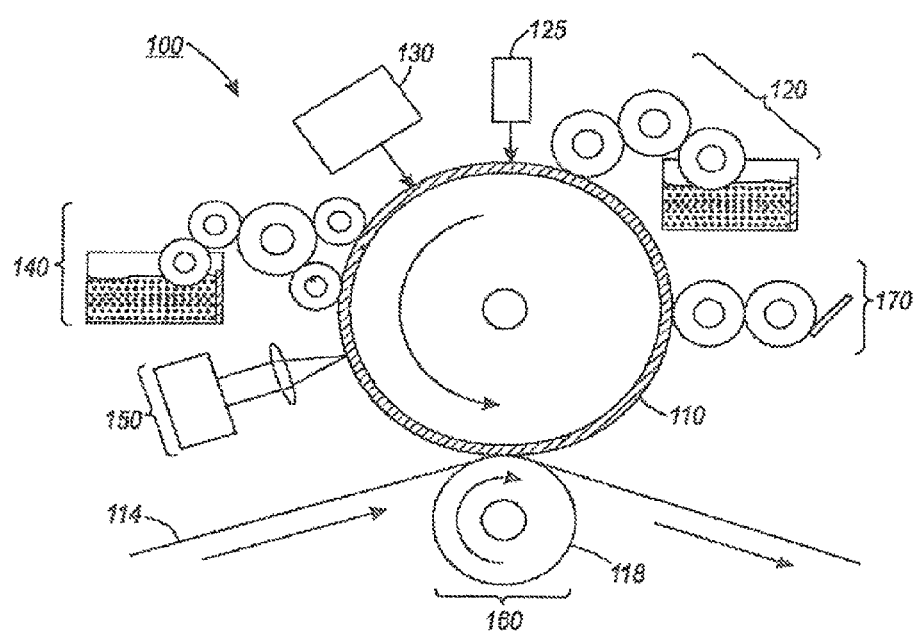
RELATED ART

ACRYLATE INK COMPOSITIONS FOR INK-BASED DIGITAL LITHOGRAPHIC PRINTING

FIELD OF DISCLOSURE

The disclosure relates to ink compositions for printing on substrates. In particular, the disclosure relates to acrylate ink compositions useful for digital lithographic printing systems.

BACKGROUND

In typical lithographic printing systems, a printing plate is formed to have "image regions" formed of a hydrophobic/oleophilic material and "non-image regions" formed of a hydrophilic/oleophobic material. The image regions correspond to the areas on the final print (i.e., the target substrate) that are occupied by ink, whereas the non-image regions correspond to the areas on the final print that are not occupied by said ink. The hydrophilic regions accept and are readily wetted by a water-based fluid, commonly referred to as a dampening fluid or fountain fluid (typically consisting of water and a small amount of alcohol as well as other additives and/or surfactants to reduce surface tension). The hydrophobic regions repel dampening fluid and accept ink, whereas the dampening fluid formed over the hydrophilic regions forms a fluid "release layer" for rejecting ink. The hydrophilic regions of the printing plate thus correspond to unprinted areas, or "non-image areas", of the final print.

The ink may be transferred directly to a target substrate, such as paper, or may be applied to an intermediate surface, such as an offset (or blanket) cylinder in an offset printing system.

Typical lithographic and offset printing techniques utilize plates which are permanently patterned, and are therefore useful only when printing a large number of copies of the same image (i.e. long print runs), such as magazines, newspapers, and the like. However, variable data digital lithography or digital offset lithography has been developed as a system which uses a non-patterned reimageable surface that is initially uniformly coated with a dampening fluid layer. Regions of the dampening fluid are removed by exposure to a focused radiation source (e.g., a laser light source) to form pockets. A temporary pattern in the dampening fluid is thereby formed over the non-patterned reimageable surface. Ink applied thereover is retained in the pockets formed by the removal of the dampening fluid. The inked surface is then brought into contact with a substrate, and the ink transfers from the pockets in the dampening fluid layer to the substrate. The dampening fluid may then be removed, a new uniform layer of dampening fluid applied to the reimageable surface, and the process repeated.

Digital offset lithography printing systems use offset-type inks that are specifically designed and optimized to be compatible with various subsystems, including ink delivery systems and a laser imaging systems, to enable high quality digital printing at high speed. Related art offset-type inks suffer shortfall; including, but not limited to, (1) being difficult to deliver via preferred inking systems, including anilox roller-type inking systems, (2) being soluble in commonly-employed dampening fluids, such as octamethylcyclotetrasiloxane (D4), (3) causing image background and/or ghosting issues, (4) being costly to manufacture and use, and (5) exhibiting inefficient image transfer. These shortfalls, individually and in combination, tend to narrow a design space within which related art inks are usable in the context of digital offset lithography printing systems.

SUMMARY

Accordingly, there is a need to develop inks that exhibit improved qualities and that may address one or all of the above-identified shortfalls. Extensive experimentation has revealed that an emulsified acrylate ink composition may provide enhanced ease of delivery to an imaging member, such as a reimageable offset plate, enhanced transfer efficiency from the reimageable offset plate, and enhanced print quality on a variety of substrates. In addition, there is a need for a printing technology that achieves excellent printing performance on a variety of substrates at a low ink manufacturing cost.

Acrylate ink compositions having aqueous components are advantageous at least because they are cost-effective. Further, these ink compositions do not tend to degrade printing system components, such as reimageable surfaces of imaging members, with which they contact. Acrylate ink compositions should meet various sub-system requirements imposed by ink-based digital printing systems that are configured for variable data lithographic printing. These requirements include wettability, releasability from a reimageable surface of an imaging member, and compatibility with non-aqueous dampening fluids configured for use with ink-based digital printing methods and systems.

Acrylate ink compositions are provided herein that meet the foregoing requirements. The disclosed acrylate ink compositions may be effectively delivered from an anilox roller-type delivery system to a reimageable surface of an imaging member during a variable data offset printing operation in which images on the reimageable surface are changeable between cycles of the imaging member. Acrylate ink compositions in accordance with disclosed embodiments are curable emulsion inks that are formed from non-polar acrylate inks, wax emulsions, and aqueous solutions. The disclosed acrylate ink compositions exhibit stable rheology that enables delivery using an anilox roll delivery system, and demonstrate desirable transferability to a reimageable surface of an imaging member with the optional evaporation of water.

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

Additional goals and advantages will become more evident in the description of the figures, the detailed description of the disclosure and the claims.

The foregoing and/or other aspects and utilities embodied in the present disclosure may be achieved by providing an ink composition, comprising an ink base; and a wax emulsion, wherein a viscosity of the ink composition is between 80 Pa·s and 400 Pa·s at 100 rad/s and 25° C., wherein a tack of the ink composition is between 32 g-m and 45 g-m at 60 seconds, wherein a total wax content of the ink composition is between 1% and 5% by weight, based on a total weight of the ink composition, and wherein a total water content of the ink composition is between 1% and 15% by weight, based on the total weight of the ink composition.

In another embodiment, the ink composition has a viscosity between 90 Pa·s and 300 Pa·s at 100 rad/s and 25° C., a tack of the ink composition is between 35 g-m and 40 g-m at 60 seconds, a total wax content of the ink composition is between 1% and 4%, and a total water content of the ink composition is between 1% and 10%.

In another embodiment, the ink composition has a viscosity of about 150 Pa·s at 100 rad/s and 25° C., a tack of the ink composition is about 38 g-m at 60 seconds, a total wax content of the ink composition is about 2%, and a total water content of the ink composition is about 5%.

In another embodiment, the ink base comprises an acrylate and a pigment.

In another embodiment, the ink base comprises at least one of an acrylate monomer, acrylate polymer, acrylate oligomer, a trifunctional acrylate monomer, a polyester acrylate, and mixtures thereof.

In another embodiment, the wax emulsion comprises at least one of a polyethylene wax emulsion, a polypropylene wax emulsion, a carnauba wax emulsion, a paraffin wax emulsion, an ethylene vinyl acetate wax emulsion, chemically modified analogs thereof, or mixtures thereof.

In another embodiment, the wax emulsion comprises at least one an acidic, non-ionic polyethylene wax emulsion and a basic, non-ionic wax emulsion of an oxidized high density polyethylene wax.

In another embodiment, the ink composition further includes an aqueous solution, and the aqueous solution includes water; and a surfactant.

In another embodiment, the surfactant comprises at least one of a water-dispersible silicone surfactant, a fluorosurfactant, a coalescing surfactant, and mixtures thereof.

In another embodiment, the ink composition further includes at least one of stabilizers, dispersants, photoinitiators, and rheology additives.

In another embodiment, the ink composition further includes at least one of water, surfactants, stabilizers, dispersants, photoinitiators, pigments, acrylates, and rheology additives, and the surfactant lowers the surface tension of the aqueous solution to below a surface tension of at least one of the ink base and a mixture of the ink base and the wax emulsion.

The foregoing and/or other aspects and utilities embodied in the present disclosure may be achieved by providing a method of preparing an ink composition, including preparing an ink base; and mixing a wax emulsion with the ink base, wherein a viscosity of the ink composition is between 80 Pa·s and 400 Pa·s at 100 rad/s and 25° C., wherein a tack of the ink composition is between 32 g-m and 45 g-m at 60 seconds, wherein a total wax content of the ink composition is between 1% and 5% by weight, based on a total weight of the ink composition, and wherein a total water content of the ink composition is between 1% and 15% by weight, based on the total weight of the ink composition.

In another embodiment, the method further includes dispersing an aqueous solution to the mixture of the acrylate ink base and wax emulsion, wherein the aqueous solution comprises water and a surfactant, and wherein the aqueous solution is dispersed in the ink composition an inverse emulsion.

In another embodiment, the ink composition has a viscosity between 90 Pa·s and 300 Pa·s at 100 rad/s and 25° C., a tack of the ink composition is between 35 g-m and 40 g-m at 60 seconds, a total wax content of the ink composition is between 1% and 4%, and a total water content of the ink composition is between 1% and 10%.

In another embodiment, the ink composition has a viscosity of about 150 Pa·s at 100 rad/s and 25° C., a tack of the ink composition is about 38 g-m at 60 seconds, a total wax content of the ink composition is about 2%, and a total water content of the ink composition is about 5%.

In another embodiment, the ink base is formed by mixing a pigment composition with at least one of an acrylate monomer, acrylate polymer, acrylate oligomer, a trifunctional acrylate monomer, a polyester acrylate, and mixtures thereof.

In another embodiment, the method further includes introducing at least one of UV stabilizers, dispersants, photoinitiators, and rheology additives to the ink composition.

In another embodiment, the method further includes introducing at least one of water, surfactants, UV stabilizers, dispersants, photoinitiators, pigments, acrylates, and rheology additives to the ink composition.

The foregoing and/or other aspects and utilities embodied in the present disclosure may be achieved by providing a method of printing using a variable data digital lithographic printing device, including applying an ink composition to a reimageable surface of an imaging member; evaporating water from the ink composition applied to the reimageable surface of the imaging member; and transferring the ink composition from the reimageable surface to a substrate, wherein the ink composition includes an ink base; and a wax emulsion, wherein a viscosity of the ink composition is between 80 Pa·s and 400 Pa·s at 100 rad/s and 25° C., wherein a tack of the ink composition is between 32 g-m 45 g-m at 60 seconds, wherein a total wax content of the ink composition is between 1% and 5% by weight, based on a total weight of the ink composition, and wherein a total water content of the ink composition is between 1% and 15% by weight, based on the total weight of the ink composition.

In another embodiment, the ink composition further includes an aqueous solution, wherein the aqueous solution includes water; and a surfactant, and wherein the surfactant lowers the surface tension of the aqueous solution to below a surface tension of at least one of the ink base and a mixture of the ink base and the wax emulsion.

BRIEF DESCRIPTION OF THE DRAWINGS

These and/or other aspects and advantages in the embodiments of the disclosure will become apparent and more readily appreciated from the following description of the various embodiments, taken in conjunction with the accompanying drawings of which:

FIG. 1 illustrates a variable image digital printing system with which acrylate ink compositions according to this disclosure may be used.

It should be noted that some details of the drawings have been simplified and are drawn to facilitate understanding of the present teachings rather than to maintain strict structural accuracy, detail, and scale.

The drawings above are not necessarily to scale, with emphasis instead generally being placed upon illustrating the principles in the present disclosure. Further, some features may be exaggerated to show details of particular components. These drawings/figures are intended to be explanatory and not restrictive.

DETAILED DESCRIPTION

Reference will now be made in detail to the various embodiments in the present disclosure. The embodiments are described below to provide a more complete understanding of the components, processes and apparatuses disclosed herein. Any examples given are intended to be illustrative, and not restrictive. Throughout the specification and claims, the following terms take the meanings explicitly associated herein, unless the context clearly dictates otherwise. The phrases "in some embodiments" and "in an embodiment" as used herein do not necessarily refer to the same embodiment(s), though they may. Furthermore, the phrases "in another embodiment" and "in some other embodiments" as used herein do not necessarily refer to a different embodiment, although they may. As described below, various embodiments may be readily combined, without departing from the scope or spirit of the present disclosure.

As used herein, the term "or" is an inclusive operator, and is equivalent to the term "and/or," unless the context clearly dictates otherwise. The term "based on" is not exclusive and allows for being based on additional factors not described, unless the context clearly dictates otherwise. In the specification, the recitation of "at least one of A, B, and C," includes embodiments containing A, B, or C, multiple examples of A, B, or C, or combinations of A/B, A/C, B/C, A/B/B/B/C, A/B/C, etc. In addition, throughout the specification, the meaning of "a," "an," and "the" include plural references. The meaning of "in" includes "in" and "on."

All physical properties that are defined hereinafter are measured at 20° to 25° Celsius unless otherwise specified. The term "room temperature" refers to 25° Celsius unless otherwise specified.

When referring to any numerical range of values herein, such ranges are understood to include each and every number and/or fraction between the stated range minimum and maximum. For example, a range of 0.5-6% would expressly include all intermediate values of 0.6%, 07%, and 0.9%, all the way up to and including 5.95%, 5.97%, and 5.99%. The same applies to each other numerical property and/or elemental range set forth herein, unless the context clearly dictates otherwise.

The present disclosure has been described with reference to exemplary embodiments. Although a few embodiments have been shown and described, it will be appreciated by those skilled in the art that changes may be made in these embodiments without departing from the principles and spirit of preceding detailed description. It is intended that the present disclosure be construed as including all such modifications and alterations insofar as they come within the scope of the appended claims or the equivalents thereof. For example, while the embodiments below are described in view of the printing system illustrated in FIG. 1, it should be understood that embodiments of the acrylate ink compositions described herein may also be used with other compatible printing systems.

An emulsion is a mixture of two or more liquids that may be immiscible. An emulsion is part of a more general class of two-phase systems of matter known as colloids. Those of skill in the art recognize that the terra "inverse emulsion" may be characterized as referring to a class of emulsions in which, for example, water is dispersed in a continuous phase of oil. In an emulsion, a first liquid, the dispersed phase, is dispersed in a second liquid, the continuous phase. In an inverse emulsion, for example, water may be the dispersed phase with oil being the continuous phase. An inverse emulsion is also characterized by stability of the dispersion of the two phases over an extended period of time, or over the required time period for use of the materials. A stable phase may be characterized by no detectable separation and stable rheological measurement.

Ink compositions in accordance with embodiments recited herein are suitable for ink-based digital printing, "Variable data lithography printing," or "ink-based digital printing," or "digital offset printing," as these terms may be used throughout this disclosure, refer to lithographic printing of variable image data for producing images on a substrate that, are changeable with each subsequent rendering of an image on the substrate in an image forming process. "Variable data lithographic printing" includes offset printing of ink images using lithographic ink where the images are based on digital image data that may vary from image to image. Ink-based digital printing uses a variable data lithography printing system or digital offset printing system. A "variable data lithography system" is a system that is configured for lithographic printing using lithographic inks and based on digital image data, which may vary from one image to the next.

By way of example, an ink-based digital printing system with anilox roll ink delivery subsystem that may be used with embodiments of the acrylate ink compositions herein is described in U.S. patent application Ser. No. 13/095,714, U.S. patent application Ser. No. 13/095,714 ("714 Application"), titled "Variable Data Lithography System," filed on Apr. 27, 2011, by Timothy Stowe et al., which is commonly assigned, and the disclosure of which is hereby incorporated by reference herein in its entirety, describes an exemplary variable data lithography system 100 for ink-based digital printing in FIG. 1.

A general description of the exemplary printing system 100 shown in FIG. 1 is provided below. Additional details regarding individual components and/or subsystems shown in the exemplary system 100 of FIG. 1 may be found in the 714 Application.

As illustrated in FIG. 1, a printing system 100 may include an imaging member 110. While the imaging member 110 is illustrated in FIG. 1 as a drum, in other embodiments, the imaging member 110 could also be embodied as a plate, belt, or another now known or later developed configuration. The imaging member 110 includes a reimageable surface that may be formed of materials including, for example, a class of materials commonly referred to as silicones, including polydimethylsiloxane (PDMS), among others. For example, silicone, fluorosilicone, and/or fluoroelastomer may be used to form the reimageable surface of the imaging member 110. The reimageable surface may be formed of a relatively thin layer over a mounting layer, a thickness of the relatively thin layer being selected to balance printing or marking performance, durability, and manufacturability.

In some embodiments, the imaging member 110 is used to apply an inked image to an image receiving media substrate 114 at a transfer nip 112. The transfer nip 112 may be formed by an impression roller 118, as part of an image transfer mechanism 160, exerting pressure in the direction of the imaging member 110. Image receiving medium substrate 114 should not be considered to be limited to any particular composition, such as; for example, paper, plastic, or composite sheet film. The exemplary printing system 100 may be used for producing images on a wide variety of image receiving media substrates 114. The 714 Application also explains the wide latitude of marking printing) materials that may be used, including marking materials with pigment densities greater than 10% by weight. As does the 714 Application, this disclosure will use the term ink to refer to a broad range of printing or marking materials to include those which are commonly understood to be inks, pigments, and other materials which may be applied by the exemplary system 100 to produce an output image on the image receiving media substrate 114.

The 714 Application depicts and describes details of the imaging member 110 including the imaging member 110 being comprised of a reimageable surface layer formed over a structural mounting layer that may be, for example, a cylindrical core, or one or more structural layers aver a cylindrical core.

The exemplary printing system 100 may include a dampening fluid system 120 generally comprising a series of rollers, which may be considered as dampening rollers or collectively as a dampening unit, for uniformly wetting the reimageable surface of the imaging member 110 with dampening fluid. One purpose of the dampening fluid system 120 is to deliver a layer of dampening fluid, generally having a uniform and controlled thickness, to the reimageable surface of the imaging member 110. A dampening fluid such as fountain solution may comprise mainly water optionally with small amounts of isopropyl alcohol or ethanol added to reduce surface tension as well as to lower evaporation energy necessary to support subsequent laser patterning, as will be described in greater detail below. Small amounts of certain surfactants may be added to the fountain solution as well. Alternatively, other suitable dampening fluids may be used to enhance the performance of ink based digital lithography systems. Extensive experimentation has found that a preferred' dampening fluid may be D4 (octamethylcyclotetrasiloxane). Other suitable dampening fluids are disclosed, by way of example, in U.S. patent application Ser. No. 13/284,114, filed on Oct. 28, 2011, titled "Dampening Fluid for Digital Lithographic Printing," the disclosure of which is hereby incorporated herein by reference in its entirety.

Once the dampening fluid is metered onto the reimageable surface of the imaging member 110 by the dampening fluid system 120, a thickness of the dampening fluid may be measured using a sensor 125 that may provide feedback to control the metering of the dampening fluid onto the reimageable surface of the imaging member 110 by the dampening fluid system 120.

After an amount of dampening fluid is provided by the dampening fluid system 120 on the reimageable surface of the imaging member 110 an optical patterning subsystem 130 may be used to selectively form a latent image in the uniform dampening fluid layer by image-wise patterning the dampening fluid layer using, for example, laser energy. Typically, the dampening fluid will not absorb the optical energy (IR or visible) efficiently. The reimageable surface of the imaging member 110 should ideally absorb most of the laser energy (visible or invisible such as IR) emitted from the optical patterning subsystem 130 close to the surface to minimize energy wasted in heating the dampening fluid and to minimize lateral spreading of heat in order to maintain a high spatial resolution capability. Alternatively, an appropriate radiation sensitive component may be added to the dampening fluid to aid in the absorption of the incident radiant laser energy. While the optical patterning subsystem 130 is described above as being a laser emitter, it should be understood that a variety of different systems may be used to deliver the optical energy to pattern the dampening fluid.

The mechanics at work in the patterning process undertaken by the optical patterning subsystem 130 of the exemplary system 100 are described in detail with reference to FIG. 5 in the 714 Application. Briefly, the application of optical patterning energy from the optical patterning subsystem 130 results in selective removal of portions of the layer of dampening fluid.

Following patterning of the dampening fluid layer by the optical patterning subsystem 130, the patterned layer over the reimageable surface of the imaging member 110 is presented to an inker subsystem 140. The inker subsystem 140 is used to apply a uniform layer of ink, over the layer of dampening fluid and the reimageable surface layer of the imaging member 110. The inker subsystem 140 may use an anilox roller to meter an offset lithographic ink onto one or more ink forming rollers that are in contact with the reimageable surface layer of the imaging member 110. Separately, the inker subsystem 140 may include other traditional elements such as a series of metering rollers to provide a precise feed rate of ink to the reimageable surface of the imaging member 110. The inker subsystem 140 may deposit the ink to the pockets representing the imaged portions of the reimageable surface, while ink on the unformatted portions of the dampening fluid will not adhere to those portions.

The cohesiveness and viscosity of the ink residing in the reimageable layer of the imaging member 110 may be modified by a number of mechanisms. One such mechanism may involve the use of a pre-cure or rheology (complex viscoelastic modulus) control subsystem 150. The rheology control system 150 may form a partial crosslinking core of the ink on the reimageable surface to, for example, increase ink cohesive strength relative to the reimageable surface layer. Curing mechanisms may include optical or photo curing, heat curing, drying, or various forms of chemical curing. Cooling may be used to modify rheology as well via multiple physical cooling mechanisms, as well as via chemical cooling.

In some embodiments, the use of an acrylate ink composition according to embodiments described herein may enable high transfer efficiency without the use of control subsystem 150, due to rheology and/or cohesion modification through the evaporation of included water.

The ink is then transferred from the reimageable surface of the imaging member 110 to a substrate of image receiving medium 114 using a transfer subsystem 160. The transfer occurs as the image receiving media substrate 114 is passed through a nip 112 between the imaging member 110 and an impression roller 118 such that the ink within the voids of the reimageable surface of the imaging member 110 is brought into physical contact with the image receiving media substrate 114. With the adhesion of the ink having been modified by the rheology control system 150, or the adhesion of the ink promoted based on a composition of the ink, adhesion of the ink may cause the ink to adhere to the image receiving media substrate 114 and to separate from the reimageable surface of the imaging member 110. Careful control of the rheology of the ink through composition or other means, as well as temperature and pressure conditions at the transfer nip 112, may allow, or otherwise facilitate, transfer efficiencies for the ink from the reimageable surface of the imaging member 110 to the image receiving media substrate 114 to exceed 95%. While it is possible that some dampening fluid may also wet the image receiving media substrate 114, the volume of such a dampening fluid will be minimal, and will rapidly evaporate or be absorbed by the image receiving media substrate 114.

In certain offset lithographic systems, it should be recognized that an offset roller, not shown in FIG. 1, may first receive the inked image pattern and then transfer the inked image pattern to a substrate according to a known indirect transfer method.

Following the transfer of a high percentage of the ink to the image receiving media substrate 114, residual ink and/or residual dampening fluid should be removed from the reimageable surface of the imaging member 110, preferably without scraping or wearing the reimageable surface. For example, an air knife may be employed to remove residual dampening fluid and/or ink. It is anticipated, however, that some amount of ink residue may remain on the reimageable surface. Removal of such remaining ink residue may be accomplished through use of some form of cleaning subsystem 170. The 714 Application describes details of such a cleaning subsystem 170 including at least a first cleaning member such as a sticky or tacky member in physical contact with the reimageable surface of the imaging member 110, the sticky or tacky member removing residual ink and any remaining small amounts of surfactant compounds from the reimageable surface of the imaging member 110. The sticky or tacky member may then be brought into contact with a smooth roller to which residual ink may be transferred from the sticky or tacky member, the ink being subsequently stripped from the smooth roller by, for example, a doctor blade.

The 714 Application details other mechanisms by which cleaning of the reimageable surface of the imaging member 110 may be facilitated. Regardless of the cleaning mechanism, however, in some embodiments cleaning of the residual ink and dampening fluid from the reimageable surface of the imaging member 110 is needed to preventing ghosting in the proposed system. Once cleaned, the reimageable surface of the imaging member 110 is again presented to the dampening fluid system 120 by which a fresh layer of dampening fluid is supplied to the reimageable surface of the imaging member 110, and the process is repeated.

The imaging member reimageable surface may preferably be formed of a polymeric elastomer, such as silicone rubber and/or fluorosilicone rubber. The term "silicone" is well understood to those of skill in the relevant art and refers to polyorganosiloxanes having a backbone formed from silicon and oxygen atoms and sidechains containing carbon and hydrogen atoms. For the purposes of this application, the term "silicone" should also be understood to exclude siloxanes that contain fluorine atoms; while the term "fluorosilicone" is used to cover the class of siloxanes that contain fluorine atoms. Other atoms may be present in the silicone rubber, for example nitrogen atoms in amine groups which are used to link siloxane chains together during crosslinking. The side chains of the polyorganosiloxane can also be alkyl or aryl.

As discussed above, inks that are useful for ink-based digital offset printing must possess physical and chemical properties that meet the specific demands of ink-based digital printing systems such as the system shown in FIG. 1. The digital offset ink must be compatible with materials with which it is intended to come in contact, including the imaging plate (reimageable surface of the imaging member) and various dampening fluids, as well as printable substrates such as paper, metal or plastic. The digital offset ink must also meet all functional requirements of the subsystems as imposed by wetting and transfer properties defined by subsystem architecture and materials sets.

In some embodiments, inks formulated for ink-based digital printing, or digital offset inks, are different in many ways from inks developed for other printing applications, including pigmented solvent inks, offset inks, flexography inks, UV gel inks, and the like. For example, digital offset inks contain much higher pigment loading leading to higher viscosities at room temperature than other inks, which can make ink delivery by way of an anilox roller system difficult. In some embodiments, digital offset inks should not cause the imaging member (reimageable) surface, which may be a silicone, fluorosilicone, or VITON-containing imaging plate or blanket, to swell and should be compatible with dampening fluid options.

Acrylate based formulations are relatively non-polar in nature, but may be emulsified with water by incorporation of a surfactant additive. Acrylate ink composition according to the embodiments disclosed herein have been found to minimize a solubility of the acrylate ink compositions in dampening fluid, such as D4, and to minimize or prevent swelling of a fluorosilicone-containing imaging member. Acrylate ink compositions in accordance with embodiments preferably exhibit a rheology that is suitable for anilox roller delivery. In some embodiments, the acrylate ink composition includes an inverse emulsion of an aqueous solution in an acrylate ink base or a mixture of an acrylate ink base and a wax emulsion. An advantage of inverse emulsification with an aqueous solution over mere dilution with water is that the inverse emulsification provides a greater energy barrier to evaporation of the water. For example, acrylate ink compositions in accordance with embodiments recited herein may be formed from non-polar acrylate ink formulations, wax emulsions, water, and surfactant to yield stable rheology suitable for anilox roller-type ink delivery systems. Acrylate ink compositions in accordance with embodiments herein include digital offset acrylate inks that exhibit desirable transferability with evaporation of water. Importantly, embodiments of the acrylate ink compositions are compatible with non-aqueous dampening fluids and exhibit desirable releasability from the imaging member (reimageable) surface after ink image formation. In some embodiments, the acrylate ink compositions may also include a pigment, an acrylate, a dispersant, a rheology modifier, a photo initiator, and/or a UV stabilizer.

For example, the acrylate ink compositions may include pigments such as Ciba IRGALITE Blue GLO. Other suitable pigments include black pigments, white pigments, cyan pigments, magenta pigments, yellow pigments, and the like. Further, pigments may be organic or inorganic particles. Suitable inorganic pigments may include carbon black. However, other inorganic pigments may be suitable such as titanium oxide, cobalt blue (CoO—Al2O3), chrome yellow (PbCrO4), and iron oxide. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitro pigments, nitroso pigments, anthanthrone pigments such as PR168, and the like.

Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment. Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226, Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110 Pigment Yellow 117, Pigment Yellow 120, Pigment Yellow 128, Pigment Yellow 138, Pigment Yellow 150, Pigment Yellow 151 Pigment Yellow 155, and Pigment Yellow 213. Such pigments are commercially available in either powder or press cake form from a number of sources including, BASF Corporation, Engelhard Corporation, and Sun Chemical Corporation.

Examples of black pigments that may be used include carbon pigments. The carbon pigments may be almost any commercially available carbon pigment that provides acceptable optical density and print characteristics. Carbon pigments suitable for use in systems and methods in accordance with embodiments may include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, Orion Engineered Carbons, and E.I. DuPont de Nemours and Company. Suitable carbon black pigments include, without limitation, Nipex 150 (available from Orion Engineered Carbons), Cabot pigments such as MONARCH 1400, MONARCH 1300, MONARCH 1100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL, and VULCAN pigments; Columbian pigments such as RAVEN 5000, and RAVEN 3500; Evonik pigments such as Color Black FW 200, FW 2, FW 2V, FW 1, FW18, FW 5160, FW S170, Special Black 6, Special Black 5, Special Black 4A, Special Black 4, PRINTEX U, PRINTEX 140U, PRINTEX V, and PRINTEX 140V. The above list of pigments includes unmodified pigment particulates, small molecule attached pigment particulates, and polymer-dispersed pigment particulates. Other pigments can also be selected, as well as mixtures thereof. In some embodiments, the pigment particle size is desired to be as small as possible to enable a stable colloidal suspension of the particles in the liquid vehicle, for example.

Acrylates or propenoates are salts and esters of acrylic acid. Acrylate and methacrylate monomers are understood to contain reactive vinyl functional groups that facilitate formation of acrylate polymers. Exemplary acrylates may include acrylate monomers or polymers, such as, trifunctional monomers, for example, Sartomer SR501 and SR9035, and polyester acrylates Sartomer CN294E, Sartomer CD 501, and Sartomer CN 2256. In particular, exemplary acrylates inks possess polar functional groups, but are substantially non-polar along the monomeric or oligomeric backbone to the extent that they are non-miscible in water without surfactant.

In some embodiments, the acrylate ink compositions may include a surfactant. For example, the acrylate ink composition may include a water-dispersible silicone surfactant such as SILSURF A004-AC-UP (available from Siltech Corporation). In other embodiment, the surfactant may be a fluorosurfactant such as CAPSTONE FS-31 from E.I. du Pont de Nemours and Company. Other exemplary surfactants include: sorbitan monostearate, FZ-77 from Dow Corning, and low foam superwetting and coalescing surfactants, such as Dynol 360 from Air Products and Chemicals, Inc.

In some embodiments, the acrylate ink compositions may include a dispersant. The dispersants may include polymeric dispersants, such as those from Lubrizol including SOLSPERSE 32000, SOLSPERSE 39000, SOLSPERSE 71000, SOLSPERSE J-100, SOLSPERSE J-200, SOLSPERSE X300, and from BASF, such as EFKA 4300, EFKA 4330, EFKA 4340, EFKA 4400, EFKA PX 4701, EFKA 4585, EFKA 5207, EFKA 6230, EFKA 7701, EFKA 7731, and from Tego, such as TEGO Dispers 656, TEGO Dispers 685, TEGO Dispers 710, and from King Industries, such as K-SPERSE A-504.

In some embodiments, the acrylate ink compositions may include rheology modifiers. Exemplary rheology modifiers may be modified or unmodified inorganic compounds including organoclays, aftapulgite clays and bentonite clays, including tetraallkyl ammonium bentonites as well as treated and untreated synthetic silicas. Suitable organoclays include from Southern Clay Products CLAYTONE HA and CLAYTONE HY. Suitable examples of tetraallkyl ammonium bentonites include from Celeritas Chemicals CELCHEM 31743-09, CELCHEM 31744-09, and CELCHEM 31745-09. Other exemplary rheology modifiers include organic compounds such as EFKA RM1900 and EFKA RM1920, both modified hydrogenated castor oils from BASF.

In some embodiments, the acrylate ink compositions may include photoinitiators. Photoinitiators may be liquid- or solid-based or combinations thereof. Suitable Type I photoinitiators include those from classes of dialkoxy-acetopheonones, dialkoxy-alkyl-pheonones, amino-alkyl-pheonones, and acyl-phosphine oxides. Suitable Type II photoinitiators include those from classes of benzophenones and thioxanthenes, which require activation from suitable amine synergists. Exemplary photoinitiators include ADDITOL LX, ADDITOL DX, ADDITOL BDK, ADDITOL CPK, ADDITOL DMMTA, ADDITOL TPO from Allnex, Esacure 1001M from IRGACURE 127, IRGACURE 184, IRGACURE 379, IRGACURE 819 and IRGACURE 2959 from BASF. Exemplary amine synergists that are used with Type II photoinitiators include SPEEDCURE PDA, SPEEDCURE EDB from Lambson, Diethylaminoethyl Methacrylate, Ethyl-4-dimethylamino benzoate, 2-Ethylhexyl 4-dimethylamino benzoate from Esstech, Inc. in some embodiment, the acrylate ink composition may include low odor photoinitiators, such as, ESACURE KIP 150 available from Lamberti S.p.A.

In some embodiments, the acrylate ink compositions may include UV stabilizers. For example, the UV stabilizers may include Sartomer USA CN3216 and BASF IRGASTAB UV22.

In some embodiments, the acrylate ink compositions may include a wax emulsion. For examples, the acrylate ink composition may include a polyethylene wax emulsion, a polypropylene wax emulsion, a carnauba wax emulsion, a paraffin wax emulsion, an ethylene vinyl acetate wax emulsion, chemically modified analogs thereof, or mixtures thereof. Some embodiments include acidic, non-ionic polyethylene wax emulsions, such as AQUACER 531 available from Byk-Chemie GmbH. Other embodiments include a basic, non-ionic emulsion of an oxidized high density polyethylene wax, such as AQUACER 552 available from Byk-Chemie GmbH.

Acrylate ink compositions in accordance with the embodiments described herein may be formed by preparing an ink base and mixing it with a wax emulsions and, in some embodiments, with an aqueous solution.

In some embodiments, the aqueous solution includes deionized water and surfactant. In one embodiment the surface tension of the water in the aqueous solution is below a surface tension of the ink with minimal surfactant, resulting in an enhanced uniformity of distribution of emulsion size of the mixture when the aqueous solution is emulsified in the acrylate ink composition.

In one embodiment, an acrylate ink composition is prepared by adding the aqueous solution drop-wise to a mixture of an ink base and a wax emulsion having components such as those disclosed above and that is configured for ink-based digital printing. For example, in one embodiment, the acrylate ink composition may be formed to have a total water content between 1% to 15%, by weight, based on the total weight of the acrylate ink composition. In another embodiment, the acrylate ink composition may have a total water content between 1% to 10% or it may be formed to have a water content of about 5%. Similarly, in some embodiments, the acrylate ink composition may be formed to have a total wax content between 1% to 5%, by weight, based on the total weight of the acrylate ink composition. In another embodiment, the acrylate ink composition may have a total wax content between 1% to 4% or it may be formed to have a wax content of about 2%.

Methods of printing with acrylate ink compositions embodiments having enhanced wetting/release properties may include applying the acrylate ink composition onto an intermediate member or central imaging member having, for example, a fluorosilicone reimageable surface. The surface tension of the acrylate ink composition may be dynamically adjusted with the use of a solid surfactant or a small concentration of a liquid surfactant. Methods may include causing the water contained in the acrylate ink composition to evaporate, enhancing a releasability of the ink from the surface of the imaging member.

Aspects of the present disclosure may be further understood by referring to the following examples. The examples are illustrative, and are not intended to be limiting embodiments thereof. Comparative Examples 1-3 illustrate a process of making an acrylate ink base. Examples 4-11 illustrate a process of making acrylate ink compositions using the acrylate ink bases of Comparative Examples 1-3 according to embodiments of the present disclosure. Examples 4-11 were found to be good examples of suitable inks for ink-based digital printing with good transferability and background performance. In some embodiments, the acrylate ink compositions were characterized by having a high tack.

Comparative Example 1

650.0 grams of CN294E from Sartomer Corporation, 54.9 grams SR501 from Sartomer Corporation, 45.0 grams SOLSPERSE 39000 from The Lubrizol Corporation and 10.0 grams CN3216 from Sartomer Corporation were added to a 2000 mL stainless steel beaker and placed on a heating mantle (available from IKA®) together with a thermocouple and stirrer apparatus also available from IKA®) and equipped with an anchor impeller.

The vessel was heated to 82° C. with the impeller stirring at 100 RPM and gradually increased to 500 RPM as the ink base components heated up. Then, 20.0 grams IRGACURE 379, 13.9 grams IRGACURE 819, both available from Sartomer Corporation, and 36.2 grams of ESACURE KIP 150 (available from Lamberti S.p.A.) were added to the vessel and allowed to stir at 500 RPM for 30 minutes. At this time, 150.0 grams of C.I. Pigment Blue 15:3 from Clariant Corporation were slowly added to the mixture and allowed to stir for an hour upon which 20.0 grams of Claytone HY organoclay, available from Southern Clay Products, was added and allowed to stir for another 30 minutes. The vessel containing the mixed components was then transferred to a high speed shearing mill (available from the Hockmeyer Equipment Corporation) equipped with a 40 mm diameter high shear Cowles blade which was then stirred at 5300 RPM for about an hour to form Component Mixture 1A. The thoroughly mixed Component Mixture A was then qualitatively transferred to a 3-roll mill apparatus (manufactured by Kent Machine Works) where Component Mixture 1A was passed through the 3-roll mill first at an apron roll speed of 500 RPM for a first pass and then at an apron roll speed of 400 RPM for a second and a third pass to form Component Mixture 1B forming the Comparative Example 1 acrylate ink base.

Comparative Example 2

650.0 grams CN294E from Sartomer Corporation, 54.9 grams SR9035 from Sartomer Corporation, 45.0 grams SOLSPERSE 39000 from The Lubrizol Corporation and 10.0 grams CN3216 from Sartomer Corporation were added to a 2000 mL stainless steel beaker. The vessel was placed on a heating mantle, (available from IKA®) equipped with a thermocouple and stirrer apparatus (also available from IKA®) and equipped with an anchor impeller. The vessel was heated to 82° C. with the impeller stirring at 100 RPM and gradually increased to 500 RPM as the ink base components were heated up. 20.0 grams IRGACURE 379, 13.9 grams IRGACURE 819 (both available from Sartomer Corporation), and 36.2 grams ESACURE KIP 150 (available from Lamberti S.p.A.) were then added to the vessel and allowed to stir at 500 RPM for 30 minutes. At this time, 150.0 grams of C.I. Pigment Blue 15:3 from Clariant Corporation were added slowly to the mixture and allowed to stir for an hour upon which 20.0 grams of Claytone HY organoclay (available from Southern Clay Products), was added and allowed to stir for another 30 minutes. The vessel containing the mixed components was then transferred to a high speed shearing mill (available from the Hockmeyer Equipment Corporation) equipped with a 40 mm diameter high shear Cowles blade which was then stirred at 5300 RPM for about an hour to form Component Mixture 2A. The thoroughly mixed Component Mixture 2A was then qualitatively transferred to a 3-roll mill apparatus (manufactured by Kent Machine Works) where Component Mixture A was passed through the 3-roll mill first at an apron roll speed of 500 RPM for the first pass and then at an apron roll speed of 400 RPM for the second and third passes to form Component Mixture 28 forming the Comparative Example 2 acrylate ink base.

Comparative Example 3

48.8 grams CN294E (from Sartomer Corporation), 4.19 grams SR501 (from Sartomer Corporation), 5.0 grams SOLSPERSE 32000 (from The Lubrizol Corporation) 0.8 grams CN3216 (from Sartomer Corporation), 1.6 grams IRGACURE 379, 1.11 grams IRGACURE 819, both available from Sartomer Corporation, 2.89 grams ESACURE KIP 150 (available from Lambert'S.p.A), 14.0 grams of Nipex 150 (available from Orion Engineered Carbons LLC), and 1.60 grams of Claytone HY organoclay (available from Southern Clay Products) were added to a 60 mL LDPE bottle. The vessel was then transferred to a laboratory RAM acoustic mixer (available from Resodyn™ Acoustic Mixers, Inc. and allowed to shake vigorously for 15 min at 100% intensity, such that the acceleration ranged between 90 to 100 G. The contents of the vessel were then qualitatively transferred to a 100 mL glass beaker and placed on a heating mantle (available from IKA®) equipped with a thermocouple and stirrer apparatus (also available from IKA®) and equipped with an anchor impeller. The vessel was then heated to 82° C. with the impeller stirring at 100 RPM and gradually increased to 500 RPM as the ink base components were heated up and further allowed to stir for 60 minutes to form Component Mixture 3A. Component Mixture 3A was then qualitatively transferred to a 3-roll mill apparatus (manufactured by Erweka GmbH) where it was passed through at an apron roll speed of 500 RPM for the first pass and then at an apron roll speed of 400 RPM for the second and third passes to form Component Mixture 3B forming the Comparative Example 3 acrylate ink base.

Example 4

10 gram of Comparative Example 1 ink base was added to a mortar upon which 0.5 grams of AQUACER 531, an acidic, non-ionic emulsion of a modified polyethylene wax (available from Byk-Chemie GmbH) was added drop-wise. The mixture was then thoroughly mixed with a pestle for 2 minutes and transferred to a small bottle and capped. It was noted that during the initial mixing phase using the mortar and pestle that the viscosity of the system collapsed owing to the very low viscosity of the added AQUACER 531 but then re-formed as the mixture continued to be mixed by mortar and pestle method over the 2 minute period. A was observed that over a 3 week period, no apparent separation of the components had occurred.

Example 5

10 grams of Comparative Example 1 ink base was added to a mortar upon which 0.5 grams of AQUACER 552, a basic, non-ionic emulsion of an oxidized high density polyethylene wax (available from Byk-Chemie GmbH) was added drop-wise. The mixture was then gently but thoroughly mixed with a pestle for 2 minutes and transferred to a small bottle and capped. It was noted that during the initial mixing phase using the mortar and pestle that the viscosity of the system collapses owing to the very low viscosity of the added AQUACER 552 but then re-formed as the mixture continued to be mixed by mortar and pestle method over the 2 minute period. To this mixture 0.06 grams of SILSURF A004-AC-UP and 0.5 grams de-ionized water were added. The resultant mixture was then gently but thoroughly mixed with a pestle for 2 minutes and transferred to a small bottle and capped. It was noted that during the initial mixing phase, the viscosity of the system collapsed owing to the very low viscosity of the added water but then re-formed as the mixture continued to be mixed by mortar and pestle method over the 2 minute period, it was observed that over a 3 week period, no apparent separation of the components had occurred.

Example 6

A mixture was prepared in the same manner as Example 4 except that Comparative Example 2 ink base was used in place of Comparative Example 1 ink base.

Example 7

A mixture was prepared in the same manner as Example 4 except that Comparative Example 2 ink base was used in place of Comparative Example 1 ink base and AQUACER 552 was used in place of AQUACER 531.

Example 8

A mixture was prepared in the same manner as Example 5 except that Comparative Example 2 ink base was used in place of Comparative Example 1 ink base.

Example 9

A mixture was prepared in the same manner as Example 5 except that Comparative Example 2 ink base was used in place of Comparative Example 1 ink base and AQUACER 531 was used in place of AQUACER 552.

Example 10

10 grams of Comparative Example 3 ink base were added to a mortar upon which 1.0 gram of AQUACER 552, a basic-stabilized wax emulsion (available from Byk-Chemie GmbH) was added drop-wise. The mixture was then gently but thoroughly mixed with a pestle for 2 minutes and transferred to a small bottle and capped. It is noted that during the initial mixing phase using the mortar and pestle that the viscosity of the system collapsed owing to the very low viscosity of the added wax emulsion but then re-formed as the mixture continued to be mixed by mortar and pestle method over the 2 minute period. 0.12 grams of SILSURF A004-AC-UP and 1.0 gram: de-ionized water was then added to this mixture. The resultant mixture was then gently but thoroughly mixed with a pestle for 2 minutes and transferred to a small bottle and capped. It is noted that during the initial mixing phase, the viscosity of the system collapsed owing to the very low viscosity of the added water but then re-formed as the mixture continued to be mixed by mortar and pestle method over the 2 minute period. It was observed that over a 3 week period, no apparent separation of the components had occurred.

Example 11

A mixture was prepared in the same manner as Example 10 except that AQUACER 531 was used in place of AQUACER 552.

The ink bases of comparative examples 1-3 and the acrylate ink compositions of examples 4-11 were analyzed in terms of rheology and tack. In particular the frequency-based sweep rheologies, between applied 0.1 and 100 rad/s frequencies, of all inks were determined on a RFS-3 rheometer (available from TA Instruments) at 25° C. equipped with a 25 mm plate at 0.5 mm gap. The rheology results of the inks can be found in Table 1 below.

Similarly, each of the ink bases of comparative examples 1-3 and the acrylate ink compositions of examples 4-11 were tested on an Inkometer 1100 (available from Thwing-Albert Company) to determine tack. The UV ink-rated rollers on the Inkometer were equilibrated at 32.2° C. In each case, 1.3 mL of ink base or acrylate ink composition was applied to the distribution roll where transfer and distribution on to the other rollers was allowed to continue for 15 seconds at 150 RPM upon which time the speed of the rollers was automatically increased to 1200 RPM. Tack measurements of the ink occur every 20 seconds for 10 minutes, the 60 second and 10 minute tack results can be found in Table 1 below in terms of grams-meters.

TABLE 1

| | Rheology and Tack Results | | | | | | | | | | |
|---|---|---|---|---|---|---|---|---|---|---|---|
| Metric | Comp. Ex. 1 | Comp. Ex. 12 | Comp. Ex. 3 | Ex. 4 | Ex. 5 | Ex. 6 | Ex. 7 | Ex. 8 | Ex. 9 | Ex. 10 | Ex. 11 |
| Water Content wt. % | 0 | 0 | 0 | 2.6 | 7.5 | 2.6 | 3.1 | 7.5 | 7.0 | 13.6 | 12.8 |

TABLE 1-continued

Rheology and Tack Results

| Metric | Comp. Ex. 1 | Comp. Ex. 12 | Comp. Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| Wax Content wt. % | 0 | 0 | 0 | 2.1 | 1.6 | 2.1 | 1.7 | 1.6 | 2.0 | 2.9 | 3.7 |
| Surfactant wt. % | 0 | 0 | 0 | 0 | 0.5 | 0 | 0 | 0.5 | 0.5 | 1.0 | 1.0 |
| Complex Viscosity @ 1 rad/s Pa·s | 1040.3 | 903.6 | 4157.1 | 808.5 | 679.3 | 918.5 | 718.0 | 886.7 | 616.9 | 5463.3 | 3739.0 |
| Complex Viscosity @ 100 rad/s Pa·s | 223.6 | 200.5 | 491.1 | 169.3 | 123.8 | 163.8 | 146.5 | 140.0 | 113.9 | 320.8 | 252.0 |
| Tack at 60 s, g-m | 34.9 | 26.5 | — | 39.0 | 40.3 | 31.8 | 38.7 | 37.3 | 40.7 | — | — |
| Tack at 10 min, g-m | 27.3 | 20.4 | — | 30.8 | 32.6 | 25.9 | 31.1 | 29.2 | 32.0 | — | — |

As illustrated on Table 1, acrylate ink compositions according to the embodiments in the disclosure not only displayed significant reductions in their viscosities, but also displayed surprising and unexpected increases in their tack. Accordingly, a wider formulation latitude is achieved over typical acrylate ink base formulations where tack increases with increased viscosity. Further, in some embodiments, the lower viscosity of the acrylate ink compositions will have improved Anilox delivery, improved plate adhesion, and a lower emulsification potential with the fountain solution, such as D4, resulting in an overall enhanced image resolution in digital printing systems.

In some embodiments, acrylate ink compositions have a complex viscosity between 80 Pa·s and 400 Pa·s at 100 rad/s. In another embodiment, the acrylate ink compositions have a complex viscosity between 90 Pa·s and 300 Pa·s at 100 rad/s. In one embodiment, the acrylate ink composition has a complex viscosity of 150 Pa·s at 100 rad/s.

In some embodiments, acrylate ink compositions have a tack measurement of between 32 g-m and 45 g-m at 60 seconds. In another embodiment, the acrylate ink compositions have a tack measurement of between 35 and 40 g-m at 60 seconds. In one embodiment, the acrylate ink composition has a tack measurement of 38 g-m at 60 seconds.

In some embodiments, acrylate ink compositions have a tack measurement of between 22 g-m and 38 g-m at 10 minutes. In another embodiment, the acrylate ink compositions have a tack measurement of between 25 and 35 g-m at 10 minutes. In one embodiment, the acrylate ink composition has a tack measurement of 30 g-m at 10 minutes.

In some embodiment, the acrylate ink compositions are characterized by having a viscosity of at least 80 Pas at 100 rad/s while maintaining a tack measurement of at least 32 g-m at 60 seconds.

In some embodiments, acrylate ink compositions with a higher tack are beneficial for increased ink transfer and image quality when used in printing systems, such as digital lithographic printing systems. In other embodiments, the presence of wax/water emulsions in the acrylate ink compositions allow for easier cleaning of the ink from the imaging plate when used in printing systems, such as digital lithographic printing systems. In some embodiments, the higher tack and lower rheology of acrylate ink compositions according to the disclosure allow efficient transfer of images from the imaging plate to a substrate without a pre-cure option.

In some embodiments, acrylate ink compositions in accordance with the embodiments of this disclosure are compatible with dampening fluids and imaging member or reimageable surface/plate materials of ink-based digital printing systems. For example, embodiments of the acrylate ink compositions may be immiscible in dampening fluids, such as D4, and provide low background in non-imaging areas. Because aqueous solutions are used, a cost of the acrylate inks compositions is also lowered.

Embodiments of the acrylate ink compositions may also allow robust printing and longer subsystem life expectancy due to high compatibility between the acrylate ink composition, dampening fluid, and ink-based digital imaging member or reimageable surface/plate materials. Acrylate ink compositions in accordance with disclosed embodiments are expected to be as easily delivered from a production anilox roller ink delivery subsystem, as they were in the experimental simulated anilox roller ink transfer system and as compared with higher viscosity conventional offset inks. Further, acrylate ink compositions in accordance with the disclosed embodiments exhibit high stability of water in ink compared with water-diluted formulations, due to the emulsion formation, which provides a higher barrier to evaporation during normal use. Finally, acrylate ink compositions in accordance with embodiments exhibit transfer efficiency of 95% or greater from the reimageable surface of the imaging member upon evaporation of water. Water removal by evaporation may be brought about by controlled application of heat or by another method during the print process.

The present disclosure has been described with reference to exemplary embodiments. Although a few embodiments have been shown and described, it will be appreciated by those skilled in the art that changes may be made in these embodiments without departing from the principles and spirit of preceding detailed description. It is intended that the present disclosure be construed as including all such modifications and alterations insofar as they come within the scope of the appended claims or the equivalents thereof.

The invention claimed is:

1. An ink composition, comprising:
an ink base; and
a wax emulsion,
wherein a viscosity of the ink composition is between 80 Pa·s and 400 Pa·s at 100 rad/s and 25° C., wherein a tack of the ink composition is between 32 g-m and 45 g-m at 60 seconds,
wherein a total wax content of the ink composition is between 1% and 5% by weight, based on a total weight of the ink composition, and
wherein a total water content of the ink composition is between 1% and 15% by weight, based on the total weight of the ink composition.

2. The ink composition of claim 1:
wherein the ink composition has a viscosity between 90 Pa·s and 300 Pa·s at 100 rad/s and 25° C.,
wherein a tack of the ink composition is between 35 g-m and 40 g-m at 60 seconds,
wherein a total wax content of the ink composition is between 1% and 4%, and wherein a total water content of the ink composition is between 1% and 10%.

3. The ink composition of claim 2:
wherein the ink composition has a viscosity of about 150 Pa·s at 100 rad/s and 25° C.,
wherein a tack of the ink composition is about 38 g-m at 60 seconds,
wherein a total wax content of the ink composition is about 2%, and
wherein a total water content of the ink composition is about 5%.

4. The ink composition of claim 3, wherein the ink base comprises an acrylate and a pigment.

5. The ink composition of claim 4, wherein the ink base comprises at least one of an acrylate monomer, acrylate polymer, acrylate oligomer, a trifunctional acrylate monomer, a polyester acrylate, and mixtures thereof.

6. The ink composition of claim 5, wherein the wax emulsion comprises at least one of a polyethylene wax emulsion, a polypropylene wax emulsion, a carnauba wax emulsion, a paraffin wax emulsion, an ethylene vinyl acetate wax emulsion, chemically modified analogs thereof, or mixtures thereof.

7. The ink composition of claim 5, wherein the wax emulsion comprises at least one an acidic, non-ionic polyethylene wax emulsion and a basic, non-ionic wax emulsion of an oxidized high density polyethylene wax.

8. The ink composition of claim 4, further comprising an aqueous solution, wherein the aqueous solution comprises:
water; and
a surfactant.

9. The ink composition of claim 8, wherein the surfactant comprises at least one of a water-dispersible silicone surfactant, a fluorosurfactant, a coalescing surfactant, and mixtures thereof.

10. The ink composition of claim 8, further comprising at least one of stabilizers, dispersants, photoinitiators, and rheology additives.

11. The ink composition of claim 1, further comprising at least one of water, surfactants, stabilizers, dispersants, photoinitiators, pigments, acrylates, and rheology additives, and
wherein the surfactant lowers the surface tension of the aqueous solution to below a surface tension of at least one of the ink base and a mixture of the ink base and the wax emulsion.

12. A method of preparing an ink composition, comprising:
preparing an ink base; and
mixing a wax emulsion with the ink base,
wherein a viscosity of the ink composition is between 80 Pa·s and 400 Pa·s at 100 rad/s and 25° C.,
wherein a tack of the ink composition is between 32 g-m and 45 g-m at 60 seconds,
wherein a total wax content of the ink composition is between 1% and 5% by weight, based on a total weight of the ink composition, and
wherein a total water content of the ink composition is between 1% and 15% by weight, based on the total weight of the ink composition.

13. The method of claim 12, further comprising:
dispersing an aqueous solution to the mixture of the ink base and wax emulsion,
wherein the aqueous solution comprises water and a surfactant, and
wherein the aqueous solution is dispersed in the ink composition an inverse emulsion.

14. The method of claim 13:
wherein the ink composition has a viscosity between 90 Pa·s and 300 Pa·s at 100 rad/s and 25° C.,
wherein a tack of the ink composition is between 35 g-m and 40 g-m at 60 seconds,
wherein a total wax content of the ink composition is between 1% and 4%, and
wherein a total water content of the ink composition is between 1% and 10%.

15. The method of claim 14:
wherein the ink composition has a viscosity of about 150 Pa·s at 100 rad/s and 25° C.,
wherein a tack of the ink composition is about 38 g-m at 60 seconds,
wherein a total wax content of the ink composition is about 2%, and
wherein a total water content of the ink composition is about 5%.

16. The method of claim 14, wherein the ink base is formed by mixing a pigment composition with at least one of an acrylate monomer, acrylate polymer, acrylate oligomer, a trifunctional acrylate monomer, a polyester acrylate, and mixtures thereof.

17. The method of claim of claim 16, further comprising introducing at least one of UV stabilizers, dispersants, photoinitiators, and rheology additives to the ink composition.

18. The method of claim 12, wherein the method further comprises introducing at least one of water, surfactants, UV stabilizers, dispersants, photoinitiators, pigments, acrylates, and rheology additives to the ink composition.

19. A method of printing using a variable data digital lithographic printing device, comprising:
applying an ink composition to a reimageable surface of an imaging member;
evaporating water from the ink composition applied to the reimageable surface of the imaging member; and
transferring the ink composition from the reimageable surface to a substrate,
wherein the ink composition comprises:
an ink base; and
a wax emulsion,
wherein a viscosity of the ink composition is between 80 Pa·s and 400 Pa·s at 100 rad/s and 25° C.,
wherein a tack of the ink composition is between 32 g-m and 45 g-m at 60 seconds,
wherein a total wax content of the ink composition is between 1% and 5% by weight, based on a total weight of the ink composition, and
wherein a total water content of the ink composition is between 1% and 15% by weight, based on the total weight of the ink composition.

20. The method of claim 19, wherein the ink composition further comprises an aqueous solution, wherein the aqueous solution comprises:
- water; and
- a surfactant, and
- wherein the surfactant lowers the surface tension of the aqueous solution to below a surface tension of at least one of the ink base and a mixture of the ink base and the wax emulsion.

* * * * *